United States Patent
Di Teodoro et al.

(10) Patent No.: US 11,994,785 B2
(45) Date of Patent: May 28, 2024

(54) DISPERSIVE BEAM STEERING BASED ON OPTICAL-FREQUENCY SHIFT PATTERNS

(71) Applicant: Raytheon Company, Waltham, MA (US)

(72) Inventors: Fabio Di Teodoro, Hacienda Heights, CA (US); Maurice J. Halmos, Encino, CA (US)

(73) Assignee: Raytheon Company, Tewksbury, MA (US)

( * ) Notice: Subject to any disclaimer, the term of this patent is extended or adjusted under 35 U.S.C. 154(b) by 953 days.

(21) Appl. No.: 16/891,263

(22) Filed: Jun. 3, 2020

(65) Prior Publication Data

US 2021/0382370 A1     Dec. 9, 2021

(51) Int. Cl.
*G02F 1/29* (2006.01)
*G01S 7/481* (2006.01)
*G01S 17/26* (2020.01)
*H04B 10/548* (2013.01)

(52) U.S. Cl.
CPC ............ *G02F 1/292* (2013.01); *G01S 7/4814* (2013.01); *G01S 7/4815* (2013.01); *G01S 7/4817* (2013.01); *G01S 7/4818* (2013.01); *G01S 17/26* (2020.01); *H04B 10/548* (2013.01)

(58) Field of Classification Search
CPC ...... G02F 1/292; G01S 7/4814; G01S 7/4815; G01S 7/4817; G01S 7/4818; G01S 17/26; H04B 10/548
See application file for complete search history.

(56) References Cited

U.S. PATENT DOCUMENTS

| | | | |
|---|---|---|---|
| 5,006,721 A | 4/1991 | Cameron et al. | |
| 5,151,814 A | 9/1992 | Grinberg et al. | |
| 5,233,673 A | 8/1993 | Vali et al. | |
| 6,262,827 B1 | 7/2001 | Ueda et al. | |
| 6,563,106 B1 | 5/2003 | Bowers et al. | |
| 6,907,124 B1* | 6/2005 | Gluckstad | H04K 1/00 380/58 |
| 7,898,712 B2 | 3/2011 | Adams et al. | |
| 8,128,246 B1 | 3/2012 | Obrien et al. | |
| 9,246,589 B2 | 1/2016 | Koonen et al. | |
| 9,753,351 B2 | 9/2017 | Eldada | |
| 10,303,037 B2 | 5/2019 | Spector et al. | |
| 2005/0211875 A1* | 9/2005 | Kawanishi | G02F 1/2255 250/208.1 |
| 2008/0259435 A1* | 10/2008 | Cicchiello | G02F 1/292 359/322 |

(Continued)

OTHER PUBLICATIONS

Kim et al., "Simulation of a Geiger-Mode Imaging LADAR System for Performance Assessment;" Article from Sensors, vol. 13; Published Jul. 3, 2013; pp. 8461-8489; 29 Pages.

(Continued)

*Primary Examiner* — Mustak Choudhury

(57) ABSTRACT

Methods and apparatus for optical beam steering including a laser to generate a beam having an optical frequency and an optical phase modulator (OPM) to impart a shift in the optical frequency of the beam from the laser. A dispersive optical element maps the shift in the optical frequency to a corresponding angle with respect to the dispersive optical element, which can comprise a diffraction grating.

18 Claims, 12 Drawing Sheets

(56) References Cited

U.S. PATENT DOCUMENTS

2016/0131676 A1* 5/2016 Smith ..................... G01S 17/58
356/28.5
2019/0250396 A1* 8/2019 Blanche ............... G02B 26/101

OTHER PUBLICATIONS

Oh et al., "Free-space Transmission with Passive 2D Beam Steering for Multi-gigabit-per-second per-beam Indoor Optical Wireless Networks;" Research Article from Optics Express, vol. 24, No. 17; Aug. 22, 2016; 17 Pages.

* cited by examiner

DISPERSIVE BEAM STEERING BASED ON OPTICAL-FREQUENCY SHIFT PATTERNS

BACKGROUND

In many applications of light detection and ranging (LiDAR) and active (laser-based) remote sensing, in a conventional system the optical beam emitted by a laser transmitter must be spatially deflected in a controlled fashion in order to search, scan, or map remote targets. One example is nadir-pointing three-dimensional topographical imaging systems installed on aircrafts or low-earth-orbit satellites. Such systems use LiDAR to map land elevation and operate by steering a laser beam in the direction perpendicular to the flight path, so as to illuminate and collect returns from an array of locations on the ground. Another example is LiDAR-based navigation systems in some self-driving vehicles, in which an array of laser beams fans out in the direction orthogonal to the ground and is then angularly scanned in the plane parallel to it.

An approach to laser beam steering frequently adopted in the prior art rests on the controlled movement of a mirror, performed by piezoelectric or voice-coil tip/tilt actuators or by galvanometers. Mirrors can also be polished on the sides of a rotating polygon or on the face of a wedge attached to a rotating shaft (nutating mirror). Electro-mechanical actuators relying on Lorentz forces, for example, can also be used to move micro mirrors. In yet another approach, the laser beam is deflected by its passage through a pair of prisms having different wedge angles, attached to a rotating frame.

These known systems having laser-beam steering all rely on moving parts and, are thus, relatively slow and subject to disruption by thermo-mechanical perturbations. Beam steering approaches not relying on moving parts are inherently more rugged and, thus, often sought after for deployment in flight platforms or ground vehicles.

Among such non-mechanical approaches taught in the prior art, are two-dimensional optical phase arrays (OPAs), which include a multitude of laser emitters having their optical phases coherently coupled and adjustable, in some embodiments, by means of electro-optical phase modulators. The far-field pointing angle of the combined beam can be continuously varied by imparting a controlled linear phase-shift spatial gradient across the emitter array. Challenges for users of OPAs include those widely known in the art of coherently combining lasers, such as the need for having multiple emitters in the first place, maintaining a stable phase relationship among them often through opto-electronic feedback loops, ensuring a high spatial fill factor in the near-field to avoid angular spreading of power into unwanted side lobes in the far field, as well as dealing with non-graceful degradation of combined performance should some emitters in the array fail. Many of these challenges are usually exacerbated in applications also requiring a high power beam delivered on the target.

In another known approach, the laser beam is transmitted through a liquid crystal (LC) cell. As the LC refractive index varies with applied voltage, an array of electrodes can be used to effectively turn the LC cell into a diffractive grating having dynamically adjustable dispersion and other properties, which results in the controlled variation in the beam exit angle. LC issues include limited speed and the fact that they process the finally emitted beam, which can be high-power in some applications, although their damage threshold power typically is significantly lower than ordinary passive optical components such as mirrors.

SUMMARY

Embodiments of the disclosure provide methods and apparatus for beam steering that (a) do not use any moving parts; (b) do not require an array of coherently combined emitters, but can rather be implemented on a single laser as well as array of lasers having arbitrary phase relationship with one another; (c) do not require a LC cell; and (d) can be used equally and without modifications on both low-power and high-power lasers, as well as on continuous-wave (CW) and pulsed lasers alike.

In embodiments, a system relies on inherently broadband optical-frequency shifting techniques applicable to any laser (regardless of it being itself wavelength-tunable or not) along with dispersive optical elements (DOEs) such as diffraction gratings, which map frequencies into far-field beam angles in the plane of dispersion, thereby achieving beam steering.

In embodiments, the active component performing the optical-frequency shifting does not need to be located at the laser output and is not exposed to high laser power, which decouples the frequency-shifting technology from the requirement of tolerating high laser power. The DOE is exposed to full laser power, but such passive optical components can be designed to withstand very high laser power.

In embodiments, the angle of a light beam emerging off a DOE varies with wavelength and includes dispersive beam steering based on electro-optic (EO) phase and/or amplitude modulation. The use of an external EO modulator decouples the beam steering function from any inherent characteristics of the laser sources such that illustrative embodiments can be applied to lasers which are not amenable to direct wavelength tuning, or exhibit unwanted behavior when directly tuned (mode hopping, chirp, power instability), and/or require non-trivial modifications (e.g. circuitry generating high-peak current pulses of controlled profile) in order to be wavelength-tuned.

In view of the high-speed and purely voltage-driven nature of EO modulators, the angular deflection is finely controlled, more precise, and much faster than afforded by both temperature- or drive-current-controlled forms of direct wavelength tuning. In addition, the unique dispersive tuning in example embodiments lends itself to a variety of embodiments involving laser system architectures and applications of interest to the photonics community.

In one aspect, an optical beam steering system comprises: a laser to generate a beam having an optical frequency; an optical phase modulator (OPM) to impart a shift in the optical frequency of the beam from the laser; and a dispersive optical element to map the shift in the optical frequency to a corresponding angle with respect to the dispersive optical element.

An optical beam steering system can further include one or more of the following features: the laser comprises a monochromatic laser, the dispersive optical element comprises a diffraction grating, the optical phase modulator comprises a fiber-coupled device having an electro-optically active crystal, the optical phase modulator comprises an electro-optic modulator (EOM), the optical phase modulator comprises an electro-optic modulator (EOM) having a purely capacitive input, a signal generator to drive the OPM with a saw tooth voltage waveform, an optical band-pass filter to filter an output of the OPM, the optical band-pass filter includes a pass band centered on an optical frequency of a side band, the shift in the optical frequency of the beam from the laser is performed completely in the opto-electronic domain without moving parts, a fiber amplifier coupled to an output of the OPM, the dispersive optical element comprises a diffraction grating to generate a diffracted beam with a diffraction angle corresponding to the optical frequency of signal from the OPM, the diffraction grating is transmissive or reflective, the diffraction grating comprises a binary grating, the diffraction grating is configured to operate in multiple orders with a diffraction efficiency the same in each of the multiple orders, additional lasers, wherein the laser and the additional lasers each have a distinct frequency and with each beam shifted in frequency such that the dispersive optical element generates a spatially single beam, a transform optical component to focus the beams at the dispersive optical element, which comprises a diffraction grating, and/or the optical beam steering system forms a part of a LiDAR system.

In another aspect, a system comprises: a plurality of lasers each configured to emit a respective beam, at least one dispersive optical element to spatially combine the beams from the plurality of lasers; and at least one optical phase modulator to impart an optical frequency shift pattern to the beams from the plurality of lasers such that the beam-combining dispersive optical elements maps the frequency shift patterns into far-field spatial beam patterns.

In a further aspect, a system comprises: a laser; an optical phase modulator to shift in frequency a beam from the laser; and one or more dispersive elements for splitting the beam into multiple diffraction orders of equal or different optical intensities such that frequency shifts in the laser result in modifications of a dispersed-beam far-field spatial pattern of intensity.

BRIEF DESCRIPTION OF THE DRAWINGS

The foregoing features of this disclosure, as well as the technical concept(s), may be more fully understood from the following description of the drawings in which.

DETAILED DESCRIPTION

Figure 1A:
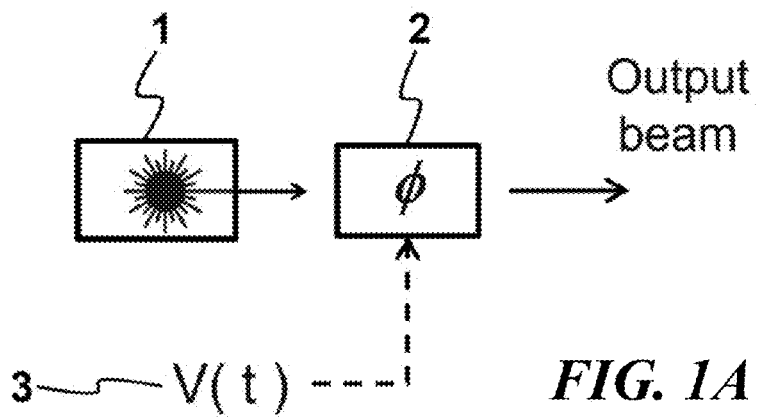
FIG. 1A is a block diagram of an example embodiment of a beam steering system having optical frequency shifting.

Before describing example embodiments of the disclosure, some information is provided. Optical frequency shifting, sometime referred to as "frequency tuning" or "wavelength tuning", is widely practiced in the art as a technique to bring lasers into resonance with optical absorption features in targets of interest for in-situ and remote spectroscopy as well as lock the laser emission to external spectral references to achieve low-noise operation.

Some lasers are inherently tunable owing to a spectrally wide optical gain medium combined with means to select the laser frequency. Examples of such tunable lasers include extended-cavity diode lasers (ECDLs), such as Littman- or Littrow-cavity ECDLs. In such lasers, the angle at which laser-emitted light impinges upon a diffraction grating (used as an external-laser-cavity reflector providing optical feedback) is controlled by means of mechanical actuators installed on the grating itself or adjacent mirrors. By varying such incident angle, the diffracted beam, i.e. the optical feedback beam propagating back into the laser gain medium, will exhibit a different wavelength, thus forcing the laser to tune accordingly. Another version of ECDL uses a fiber Bragg grating (FBG) as the external diffraction grating and can be frequency-tuned by applying a thermo-mechanical stress to the FBG, which changes the FBG period, hence the retro-reflected wavelength.

Another example is single-frequency diode lasers, such as distributed-feedback (DFB) or distributed Bragg-reflector (DBR) diode lasers. In these lasers, the emitted optical frequency can inherently be tuned by adjusting the laser temperature and/or drive current. Such electrical/thermal modifications effect a controlled refractive-index change in the Bragg reflector incorporated within the diode laser chip, either in the diode gain medium (DFB) or outside this region (DBR). The Bragg reflector index change causes the laser to tune, as its emitted wavelength is approximately given by the Bragg wavelength, hence proportional to the refractive index.

Dispersive components mounted on moving stages driven by electric motors or piezo-actuators are generally adopted in other well-known tunable sources such as titanium-sapphire lasers.

Common to these techniques for inherent laser-frequency tuning is a relatively low tuning bandwidth/speed. For example, the temperature-tuning bandwidth of many diode lasers is limited by the thermal capacity of the diode chip, typically to bandwidths <1 kHz. Tuning with drive current can be somewhat faster, up to ~10 kHz bandwidth or higher. Both temperature- and drive-current-based tuning may not be particularly precise or reproducible over many cycles and cause the diode laser output to undergo power variations as well as possible spectral mode hops. Besides being inherently slow as well, techniques based on moving parts may further suffer from electro-mechanical hysteresis and/or general sensitivity to shocks, vibrations, and temperature excursions, which tend to diminish the precision of the tuning mechanisms.

Figure 1B:
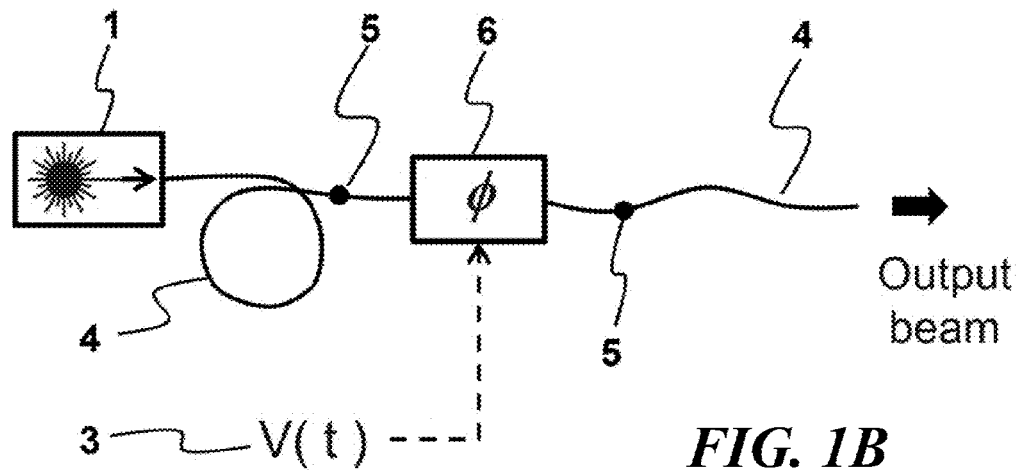
FIG. 1B is a block diagram of another example embodiment of a beam steering system having optical frequency shifting.
Figure 1C:
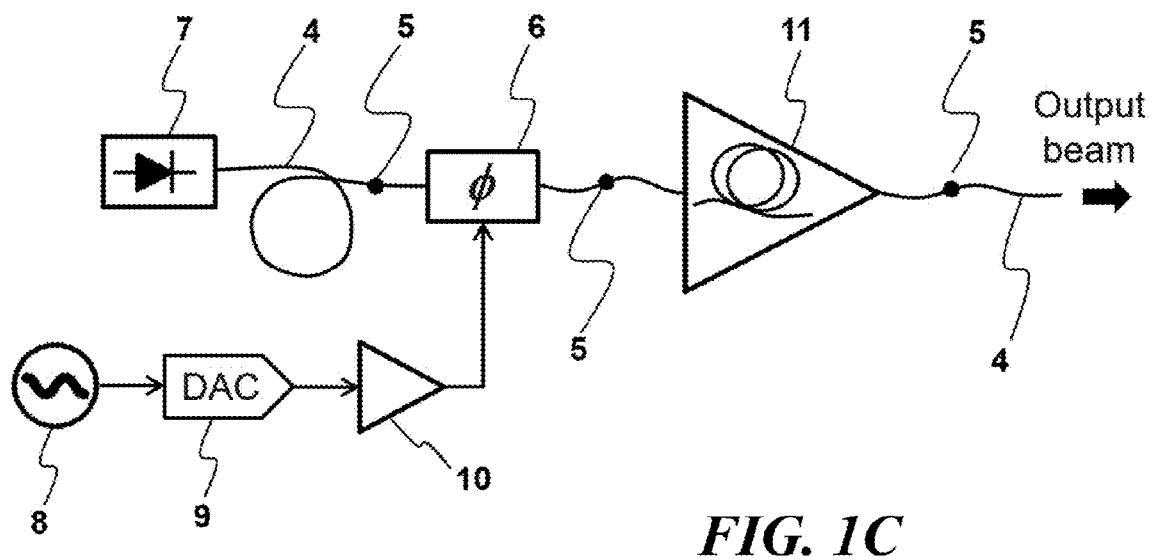
FIG. 1C is a block diagram of another example embodiment of a beam steering system having optical frequency shifting.

FIGS. 1A, 1B, and 1C show example laser architectures featuring beam frequency-shifting. FIG. 1A shows a generic laser source 1 followed by an electro-optic modulator 2, driven by a time-varying voltage source 3. FIG. 1B shows a fiber-coupled laser source 1 having its delivery fiber 4 fusion-spliced 5 to a fiber-coupled electro-optic phase modulator 6. FIG. 1C shows fiber-based laser sources used in LiDAR suitable for free-space laser communication applications including a single-frequency diode master oscillator 7 and a fiber-coupled electro-optic phase modulator driven by a voltage source including a broadband digital waveform synthesizer 8, a high-speed digital-to-analog converter 9, and a radio-frequency voltage amplifier 10. In this embodiment, a phase-modulated output beam is transmitted through a rare-earth-doped fiber amplifier 11.

Example embodiments of the disclosure include solid-state, voltage-driven EO modulators to perform optical frequency shifting, as described more fully below. Such devices permit a system to decouple frequency shifting from laser characteristics and, can thus, be used with non-tunable laser sources and operate at high speed without experiencing hysteresis or other behaviors that might reduce timing or optical phase/amplitude control precision.

Referring again to FIG. 1A, the output beam from a single-longitudinal-mode (monochromatic) laser is transmitted through an electro-optical (EO) modulator. Several implementations of EO modulators can be devised for frequency shifting and are quantitatively discussed as examples below and many others are possible as well.

To quantify the effect of EO modulation on the laser beam, let the electric field, E(t), associated with the laser beam be expressed in complex notation as $$E(t) = A \exp[2\pi i v_0 t + i\varphi(t)], \quad (1)$$

where t denotes time, $v_0$ is the field "carrier" oscillation frequency, A is the field amplitude, which can be constant in the case of continuous wave (CW) emission or time-varying to yield a pulse envelope on a time scale slower than $1/v_0$ (namely, the field period of oscillation), and $\varphi(t)$ is the time-dependent optical phase term. The field instantaneous frequency, v(t), is then given by $$v(t) = v_0 + \frac{1}{2\pi} \frac{\partial \varphi(t)}{\partial t}. \quad (2)$$

As implied by Eq. (2), a direct approach to frequency shifting is to control the time dependence of the electric field optical phase, which can be accomplished in a direct way by transmitting the laser beam through an optical phase modulator (OPM). In example embodiments, the OPM comprises a fiber-coupled device featuring an electro-optically active crystal, such lithium niobate, in which the refractive index can be dynamically varied via the Kerr effect by the application of an external voltage.

In embodiments, the laser beam associated with the electric field E(t) is guided through a planar waveguide etched within the crystal and the voltage is applied across the waveguide, perpendicularly to the propagation direction of the laser beam, by a pair of microelectrodes soldered to metal-coated portions of the crystal. The crystal/electrode assembly is enclosed within a hermetic package equipped with input and output fiber-optic pigtails.

The relationship between applied voltage, V(t), and induced optical phase shift in such OPMs is linear and given by $$\varphi(t) = \pi \frac{V(t)}{V_\pi}. \quad (3)$$

Here, $V_\pi$ (typically ~3-6 V in many commercial devices) is the voltage required to yield a phase shift of $\pi$ radians and can be expressed in terms of intrinsic device properties as $$V_\pi = \frac{\lambda d}{rn^3 L \Gamma}, \quad (4)$$

where r is the crystal material electro-optic coefficient (e.g., ~3.2×10⁻¹¹ m/V in lithium niobate), n is the crystal static refractive index (e.g., ~2.2 in lithium niobate), L is the crystal length, $\lambda$ is the laser beam wavelength, d (typically, <20 μm) is the width of the gap between the electrodes (which reflects also the width of the waveguide within the crystal), and F is a coefficient describing the degree of spatial overlap between the cross-sectional laser beam intensity profile and electric field applied to the crystal.

Figure 1D:
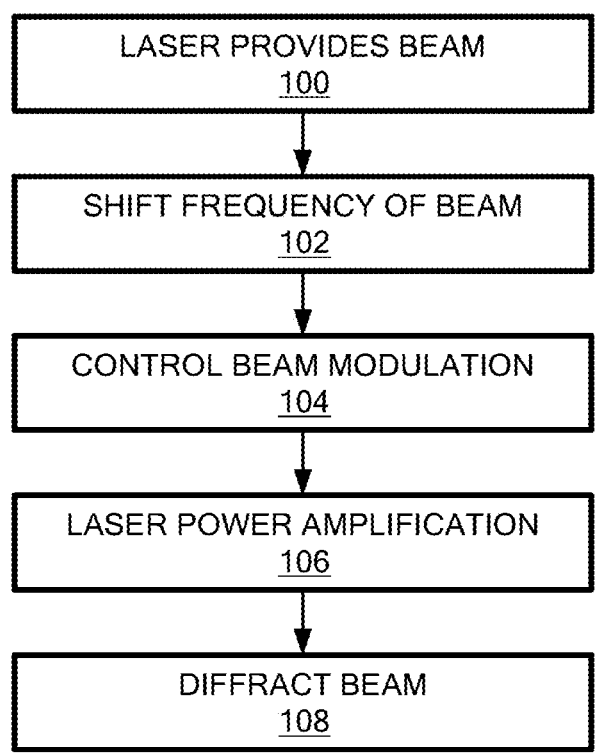
FIG. 1D is a flow diagram showing an example sequence of steps for beam steering based on optical-frequency shift patterns.

FIG. 1D shows an example sequence of steps for beam steering based on optical-frequency shift patterns. In step 100, a laser source is employed to provide a beam. In some embodiments, the laser source is monochromatic. In some embodiments, a plurality of laser sources are used some of which may be of different wavelengths. In step 102, an optical phase modulator (OPM) shifts a frequency of the beam from the laser. In some embodiments, the OPM comprises a EO modulator. In other embodiments, the OPM comprises a fiber-coupled electro-optic phase modulator. In step 104, the OPM receives an input signal to control modulation of the laser beam for shifting the beam in optical frequency. Example modulation waveforms include saw tooth and sinusoidal. In optional step 106, the signal can be input to a laser power amplifier. In step 108, the output beam from the OPM is received by a dispersive optical element, such as a diffraction grating. The beam(s) from one or more of the lasers can be shifted in frequency to achieve a selected diffraction angle from the grating. For example, respective beams can be shifted in frequency to generate a single spatial beam. In other embodiments, beams can be modulated to form a desired beam pattern.

Figure 2:
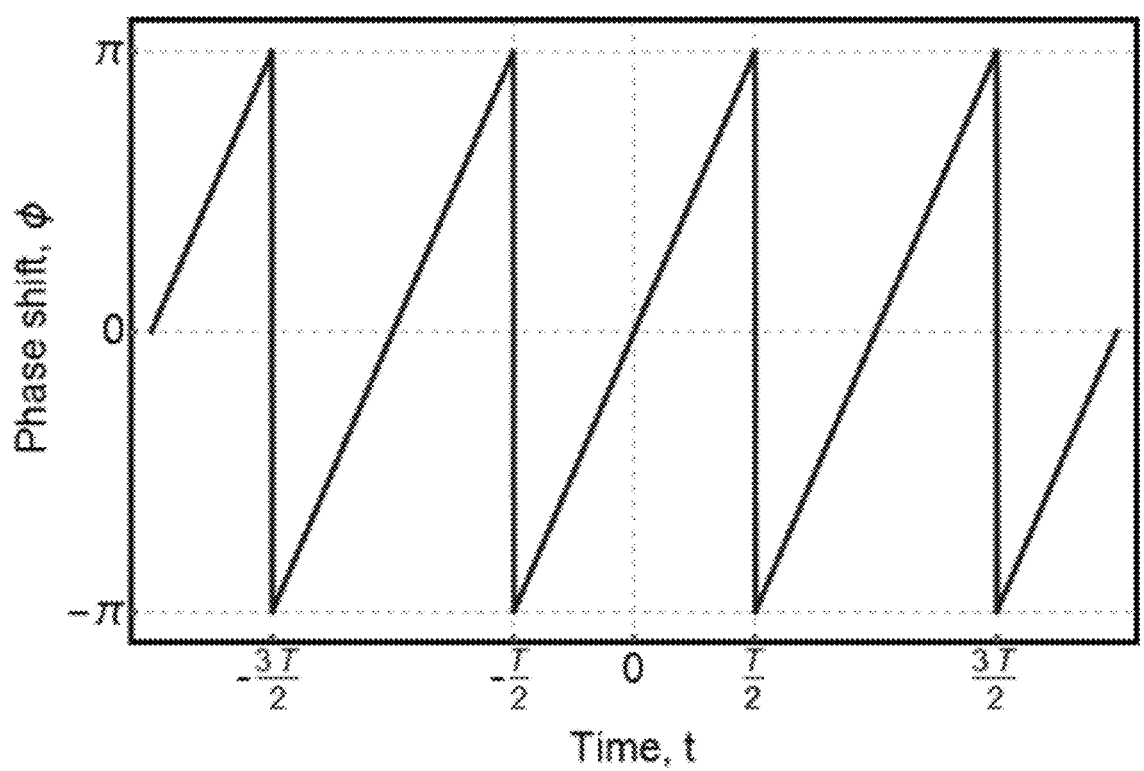
FIG. 2 is a waveform diagram of an example serrodyne phase modulation.

FIG. 2 shows an example temporal profile of serrodyne phase modulation having period=T and total phase shift=$2\pi$. A relatively simple frequency-shifting technique, sometime referred to as "serrodyne modulation", comprises driving the OPM with a saw-tooth voltage waveform, as depicted in FIG. 2. During the ramp segments of the modulation, the laser beam optical phase varies linearly, which means that its derivative with respect to time, hence the frequency shift, $\Delta v$, is constant and given by $$\Delta v = \frac{\Delta \varphi}{2\pi T}, \quad (5)$$

where $\Delta\varphi$ is the peak-to-peak excursion of the phase modulation (which is, in turn, proportional to the peak-to-peak saw-tooth voltage amplitude) and T is the saw-tooth period.

Referring again to FIG. 1C, the digital arbitrary waveform generator 8 is programmed to output a digitized form of the required voltage signal, which is fed into a high-speed digital-to-analog converter (DAC) 9 followed by a radio-frequency voltage amplifier 10 driving the OPM 6.

In other embodiments, the initial digital signal can be produced by a field-programmable gate array or other broadband multi-tone synthesizers.

In commercially available EO OPMs driven by such high-speed electronic components, the overall operation bandwidth, hence the optical frequency shift for $\Delta\varphi=2\pi$, can exceed 40 GHz, or even greater in some embodiments.

The serrodyne modulation exhibits "resets", namely rapid pick-to-bottom drops characterizing the saw-tooth waveform indicated in FIG. 2, because the drive voltage cannot grow indefinitely. In practical saw-tooth waveforms, the resets are not instantaneous, but rather employ a finite, characteristic time to occur, which depends on the bandwidth of the voltage source used to drive the OPM and on that of the OPM itself. When the laser optical field experiences a reset, the optical phase varies rapidly leading to a quick frequency chirp, the functional form of which reflects the characteristic response function of the combined drive-source/OPM system. In some pulsed laser regimes of operation, the serrodyne modulation can be timed in such a way that the resets only occur between pulses where they have no effect. For this to be possible the pulse duration must be shorter than the serrodyne modulation period and the ratio of the pulse repetition period to the serrodyne period must be such that no pulse temporally overlaps with a reset over a runtime of interest. The latter requirement is achieved by synchronizing the serrodyne modulation to the same time clock triggering the emission of the laser pulses. Since many LiDAR applications rely on few nanosecond pulses, in such applications the former requirement can be met only for relatively slow serrodyne modulations having <1 GHz. In CW applications, the resets are unavoidable, but can be restricted to affect the laser over acceptable, very short periodic intervals through the use of adequately high-speed OPM and control electronics.

Figures 3A, 3B:
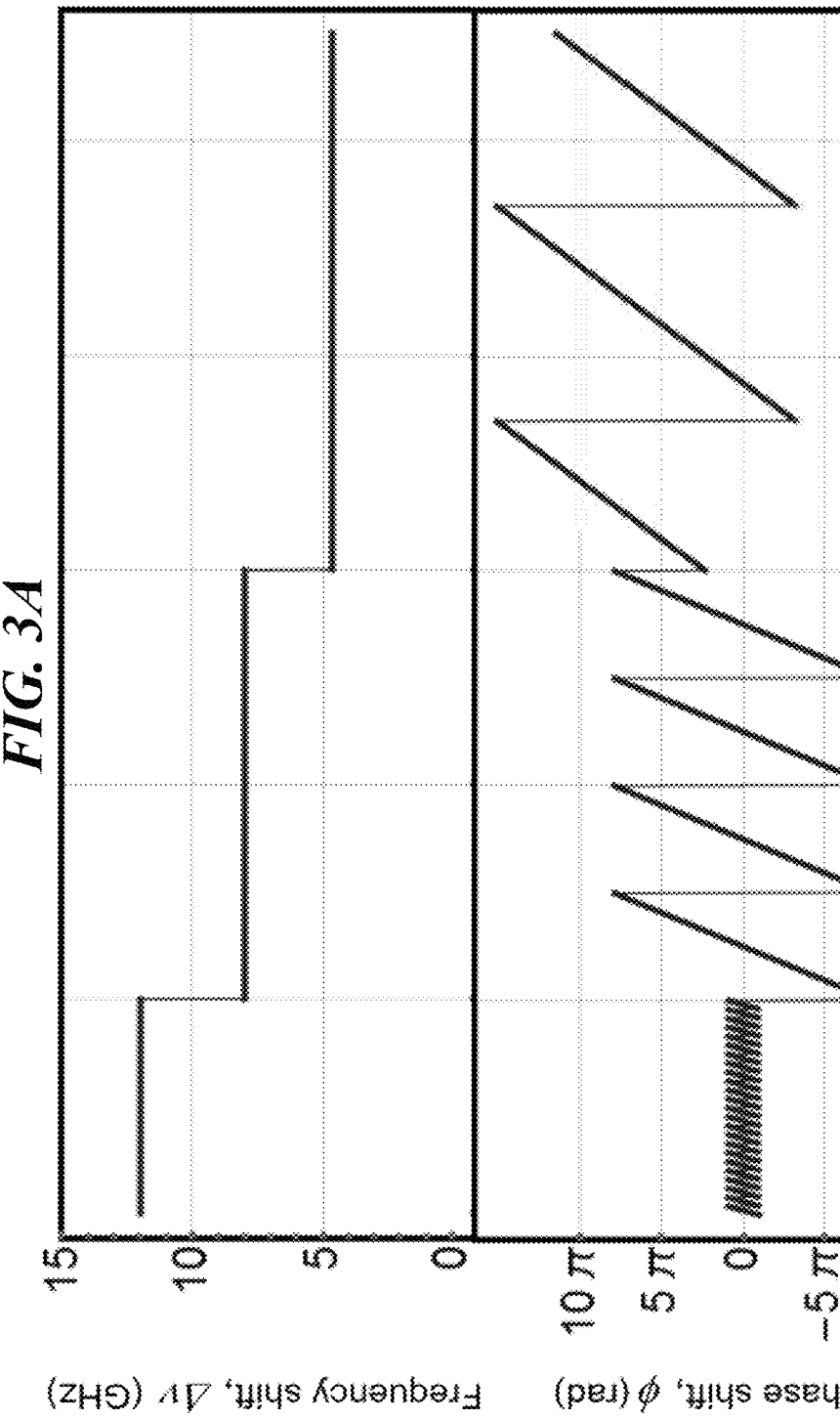
FIG. 3A is a waveform diagram of a step-wise frequency shift corresponding to a composite saw-tooth phase modulation and FIG. 3B is a waveform diagram of phase shift over time.

FIG. 3A shows a step-wise frequency shift corresponding to a composite saw-tooth phase modulation and FIG. 3B shows both plotted vs. time. In some embodiments, large frequency shifts can still be obtained through relatively slow serrodyne modulation, in which the OPM is driven by voltage signals of peak-to-peak amplitude higher than $2V_\pi$. This is, for example, possible with certain EO OPMs exhibiting a purely capacitive input impedance, which can tolerate high drive voltages without incurring damaging ohmic heating. The serrodyne excursion $\Delta\varphi$ can be set to be equal to $2\pi N$, where N is an arbitrary integer (in FIG. 2, N=1, which is the simplest case applicable even to the fastest OPMs). In this case, the modulation resets do not cause phase jumps because the optical phase is defined to within integer multiples of $2\pi$ and, thus, the optical field after a reset remains coherent with that before. For other embodiments, however, $\Delta\varphi$ can be chosen to be different from $2\pi N$ and, in fact, a different value for $\Delta\varphi$ can be assigned to each reset, for example extracted from a random sequence of $\Delta\varphi$ values, as shown in the composite serrodyne modulation trace in FIG. 3. In such cases, the coherence time of the laser is limited to the period of the serrodyne modulation. In some embodiments, this pattern of deterministic or random phase jumps can conveniently be leveraged to disrupt unwanted parasitic processes requiring high temporal coherence to build up such as stimulated Brillouin scattering in fiber lasers.

In another embodiment, other phase modulation patterns can be applied to the laser beam so as to achieve a desired time-varying optical-frequency shifting behavior, also referred to as frequency chirp. In particular, periodic phase modulations result in frequency scanning operation, in which the frequency varies continuously and periodically between extreme values given by $v_0 \pm \Delta v$. For example, based on Eq. (2), the phase pattern $$\varphi(t) = \frac{\Delta v}{f}\sin 2\pi ft, \quad (5)$$

results in a sinusoidal modulation of the carrier optical frequency:

$$v(t) = v_0 + \frac{1}{2\pi}\frac{\partial \varphi(t)}{\partial t} = v_0 + \Delta v \cos 2\pi ft, \quad (6)$$

with period T=1/f. In some embodiments, the sinusoidal frequency f can exceed 40 GHz, as possible with commercially available EO OPMs mentioned above, resulting in complete optical frequency "swings" occurring within times as short as ~25 ps or even shorter in other embodiments. As in many embodiments of interest for LiDAR applications, the laser operates in pulse mode such that optical pulses of few ns duration are emitted at pulse repetition frequency of 10 s of kHz or higher, it is possible in such applications to time the optical frequency swing so that clusters of few consecutive pulses, or even individual pulses, each exhibit a different frequency.

Figure 4:
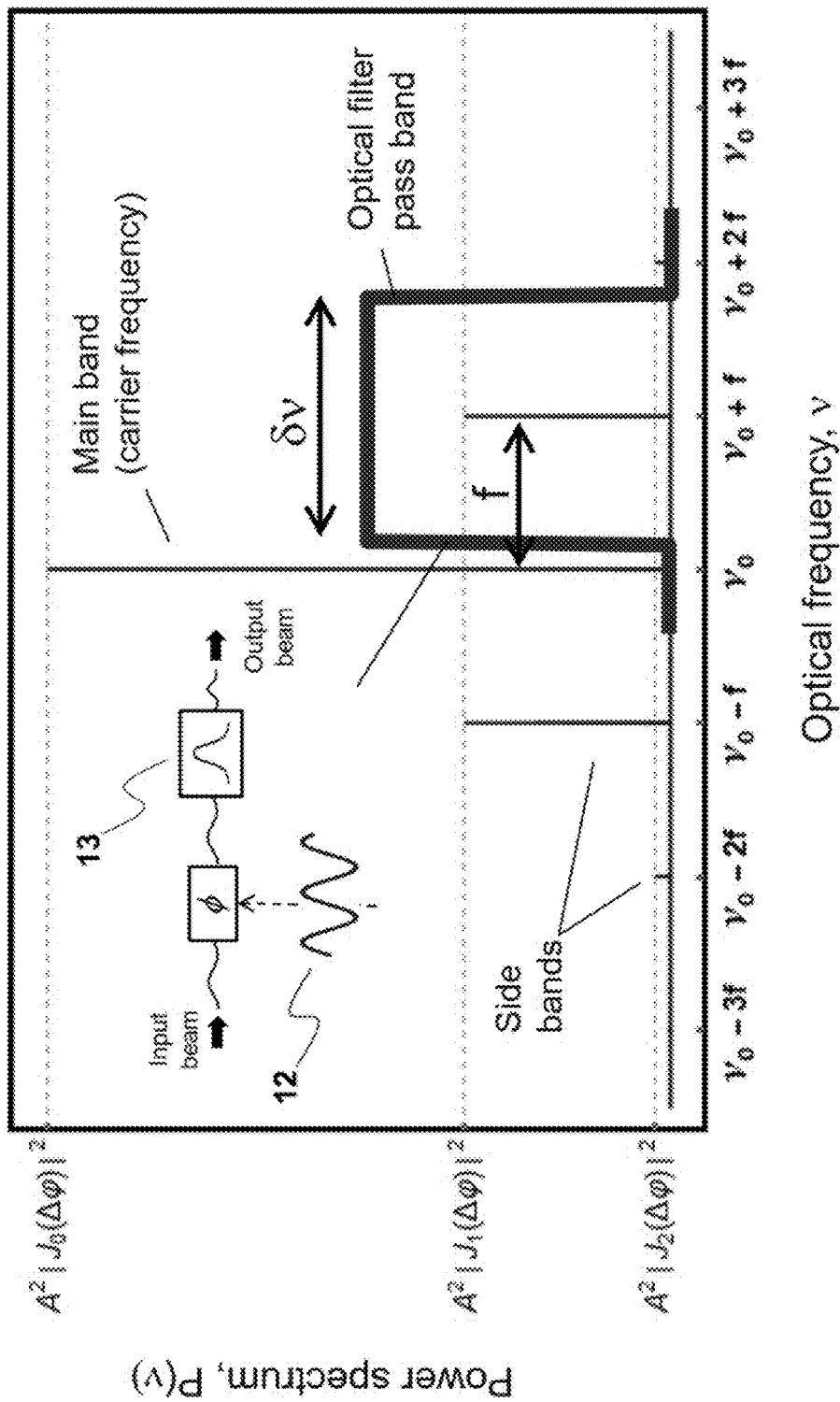
FIG. 4 is a representation of a laser beam power spectrum transmitted through an optical phase modulator.

FIG. 4 shows a further embodiment having an OPM again driven to produce a sinusoidal optical-phase modulation, followed by an optical band-pass filter, and includes fiber-coupled optical components. FIG. 4 shows a power spectrum of a laser beam transmitted through an optical phase modulator driven by a sinusoidal signal 12 of frequency f. The gray, thick trace denotes the spectral profile of an optical band-pass filter 13 having a pass band centered at the optical frequency of a side band (e.g. $v_0$+f, as shown) and bandwidth $\delta v$.

In this embodiment, $$\varphi(t) = \frac{\Delta\varphi}{2}\sin 2\pi ft, \quad (7)$$

where $\Delta\varphi$ denotes the peak-to-peak phase excursion of and f (Hz) the frequency of the sinusoidal modulation. By substituting Eq. (7) into Eq. (1) and using the Jacobi expansion, the laser electric field, transmitted through the OPM, can be written as $$E(t)=A \exp(2i\pi v_0 t)\Sigma_{n=-\infty}^{\infty}J_n(\Delta\varphi)\exp(2\pi inft). \quad (8)$$

Here, $J_n$ denotes Bessel functions of first kind and order n. The corresponding laser power spectrum, P(v), can be expressed as $$P(\tilde{v})=|\int_{-\infty}^{\infty}E(t)\exp(-2i\pi vt)dt|^2 \sim A^2\Sigma_{n=-\infty}^{\infty}|J_n(\Delta\varphi)|^2\delta(\tilde{v}-nf), \quad (9)$$

where $\tilde{v} \equiv v - v_0$ and $\delta$ is the Dirac delta function. The power spectrum in Eq. (8) consists of an infinite series of narrow lines frequency-spaced by f, the main one corresponding to the laser carrier frequency $v_0$ and the others, referred to as "side bands", being such that the n-th line in the series exhibits amplitude given by the absolute square of the n-th order Bessel function evaluated at $\Delta\varphi$.

In example embodiments, the optical band-pass filter has its spectral pass band centered at the frequency of a side band, for example the one at frequency $v_0$+f, and bandwidth $\delta v < 2f$ such that only one side band is transmitted through the filter, while the central line having the carrier frequency $v_0$ and all other side bands are blocked. In some embodiments, the filter could be a transmissive fiber-coupled thin-film filter or a reflective (transmissive) fiber Bragg grating. The beam transmitted through the filter does not exhibit a time-varying frequency, but rather a constant one corresponding to the frequency of the side-band matching the filter pass band. It is thus possible to frequency-shift the transmitted light by varying the frequency f of the sinusoidal modulation produced by the OPM.

An advantage of this frequency-shifting technique over the serrodyne modulation is that it is not affected by sudden resets and rests on single-tone generation, readily achieved with standard oscillators and related waveform generators, rather than requiring the generation of multiple harmonics to produce a saw-tooth profile. However, this technique is less bandwidth-efficient because the frequency shift is simply equal to the frequency of the applied sine wave, whereas in the case of the serrodyne modulation, it is given by the modulation frequency multiplied by the phase shift. Moreover, the frequency-shift range is limited to the pass bandwidth of the filter and the optical loss incurred by blocking most side bands as well as the central line must be offset by an optical repeater, such as a fiber amplifier.

An example feature of example embodiments is the leverage for purely opto-electronic frequency-shifting techniques such as those described above and others to perform beam steering, i.e., affect the pointing angle of a beam emitted by a single laser or array of lasers.

Figure 5:
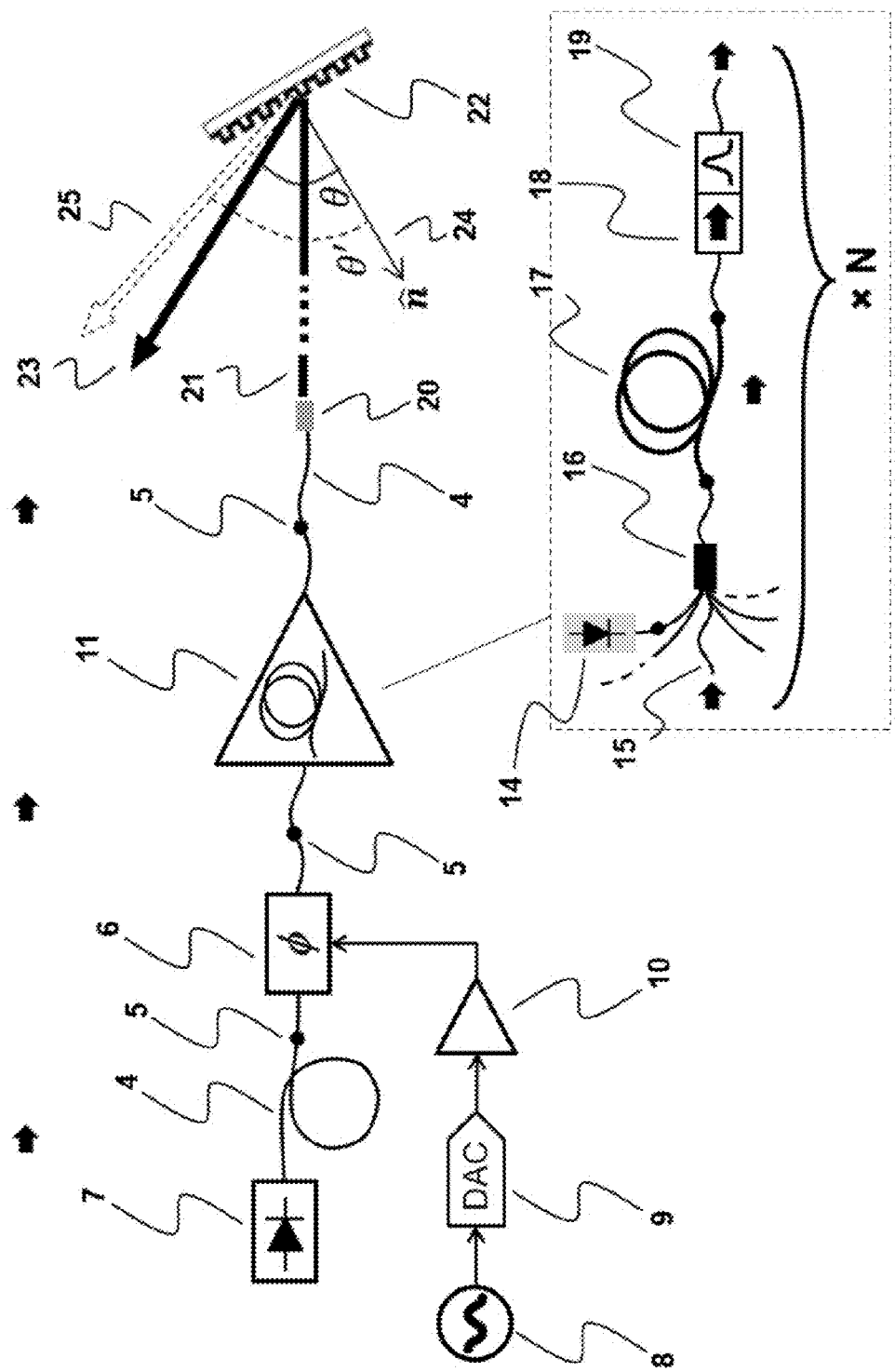
FIG. 5 is an example embodiment of a beam steering system having a MO/FA configuration.

FIG. 5 shows an illustrative embodiment in which the laser is configured as a master-oscillator/fiber-amplifier (MOFA) architecture, which supports the generation and emission of a single high-power beam. The master oscillator (MO) is a single-frequency fiber-coupled diode laser, such as a fiber-coupled DFB or DBR diode laser emitting a seed, also referred to as "signal", laser beam, which is generated within the diode laser and propagates in the MO exit fiber, being guided therein.

The laser beam, which travels from left to right in the MO/FA, is first generated by the MO 7, transmitted through a phase modulator 6, then guided in fiber to FA 11, which can be single or chain of N fiber-amplifier units, each unit including an input signal fiber 15, one or more pump diode lasers 14, pump/signal combiner 16, rare-earth-doped fiber 17, fiber-coupled Faraday optical isolator 18 and band-pass filter 19. The amplified laser beam 21 exits through the end terminal 20, and impinges on a diffractive grating 22. The corresponding diffracted beam 23 forms an angle θ with respect to the normal 24 to the grating surface. As laser beam frequency is shifted, the incidence angle remains the same, but the diffracted beam 25 emerges at a different diffraction angle θ'.

The MO exit fiber is fusion-spliced to a fiber-coupled EO modulator. In FIG. 5, the modulator is disclosed to be an EO lithium-niobate OPM, which is voltage-driven by a waveform generator-DAC-RF amplifier combo, as described in some of the frequency-shifting embodiments above.

Other embodiments including an OPM followed by a filter, or an MZM followed by a filter, as well as different voltage-driving architectures such as those described above or others not explicitly mentioned therein are equally applicable. The beam transmitted through the modulator is guided within another fiber segment to the rare-earth-doped fiber amplifier part of the MOFA architecture, which consists of one or N fiber amplifiers. In some embodiments, the input end of each amplifier is fusion-spliced to pump/signal combiner consisting of a tapered fiber bundle in which the signal beam-carrying fiber is fused to delivery fibers spliced to one or more pump diode lasers, such that signal and pump beam are multiplexed within the rare-earth fiber. The power-amplified output beam from each fiber amplifier is directed through a fiber-coupled Faraday isolator, for protection against optical feedback from components downstream. It is also directed through an optical band-pass filter, which in some embodiments is co-located in the same fiber-coupled component as the Faraday isolator. This filter does not serve any frequency-shifting purposes but rather blocks spectrally broad-band amplified spontaneous emission from each amplifier from propagating downstream and potentially degrading the spectral brightness of the amplified signal beam and/or reducing the optical gain available for the signal-beam amplification. In other embodiments not depicted here, in which the laser beam is pulsed, "time gates", namely electro-optic, acousto-optic or semiconductor amplitude modulators, can be inserted between amplifier stages as well, to block the passage of light in the time intervals between laser pulses, so as to increase the laser on/off pulse power contrast.

The power-amplified laser beam exits the MOFA through a fiber termination, which can be for example be a commercially available telecom-type fiber-optic connector, as well as one modified for transmission of high-power beams and/or equipped with an integral ball- or gradient-lens collimator. The end-facet of the termination can be angle-polished and/or anti-reflection coated or otherwise microstructured for anti-reflection, and/or surface-shaped to collimate the beam. The exiting beam is directed towards an external, reflective or transmissive, diffraction grating. Optical components such as lenses and mirrors can be used in various embodiments between the amplifier exit facet and the grating to collimate, expand, and aim the laser beam to impinge upon the grating at the correct angle and to project the desired beam footprint onto the grating surface.

The diffraction of the beam off the grating obeys a well-known dispersion relationship $$\sin \theta = m \mathcal{N} \lambda - \sin \theta_i, \quad (14)$$

where θ is the angle formed by the diffracted beam with respect to the direction, n̂, normal to the grating surface, m is an integer number denoting the diffraction order, $\mathcal{N}$ is the number of grating lines per unit length, λ is the laser wavelength, and $\theta_i$ is the beam incident angle onto the grating, relative to n̂. The plane containing the incident and diffracted beams, as well as n̂, is referred to as dispersive plane. In Eq. (14), the angles θ and $\theta_i$ are both positive only if the corresponding beams are on the same side of n̂ and have different signs otherwise. A laser beam impinging onto the grating at same incidence angle $\theta_i$, but exhibiting an optical-frequency shift Δv with the respect to previous beam is diffracted at an angle θ'=θ+Δθ, where the angular deflection Δθ is given by:

$$\Delta\theta \sim \frac{m \mathcal{N} \lambda^2}{c \cos \theta} \Delta v = \frac{m \mathcal{N} \lambda^2}{c \sqrt{1 - (m \mathcal{N} \lambda - \sin \theta_i)^2}} \Delta v, \quad (15)$$

where $v_0$ denotes the optical carrier frequency of the laser beam, as described above.

In some embodiments, the grating can comprise a suitable binary grating designed to operate efficiently in only one diffraction order. For example, Eq. (14) implies that a high-dispersion grating having $\mathcal{N} > 1/\lambda$ (i.e. sub-wavelength spacing of grating lines) can only operate in the first order ($m=\pm 1$). If the additional condition $\theta_i<0$ applies, then only the value $m=-1$ is possible and $\theta<0$ as well, which means and a single beam emerges off the grating upon diffraction and incident and diffracted beams both lie on the same side with respect to $\hat{n}$.

Figure 6:
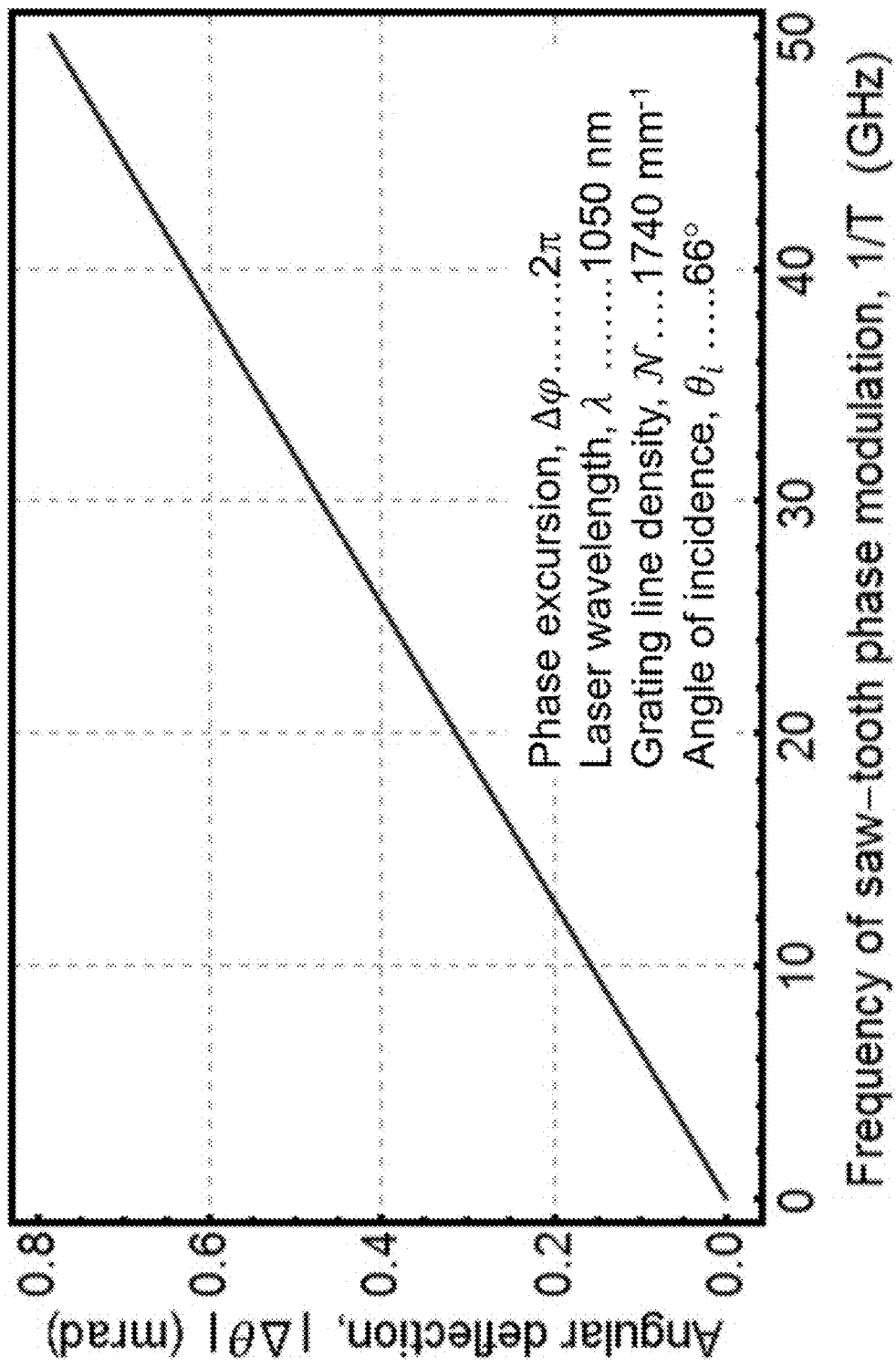
FIG. 6 is a graphical representation of angular deflection upon diffraction versus phase modulation frequency.

FIG. 6 shows angular deflection upon diffraction in the case of $2\pi$-excursion serrodyne (saw-tooth) phase modulation, plotted vs. the phase-modulation frequency. The laser wavelength is taken to be 1050 nm; the grating is assumed to feature 1740 lines per mm and be operated at near-Littrow angle of incidence (~66 degrees). The 1050 nm-wavelength laser is equipped with a serrodyne-modulated EO OPM followed by a commercially available multi-layer dielectric binary diffraction grating.

The laser can be thought of as having the MOFA architecture discussed above, featuring a pulse or CW single-frequency diode master oscillator, followed by a ytterbium (Yb)-doped fiber amplifier chain, optically pumped by 975 nm-wavelength diode lasers, with Yb-doped fibers being capable of providing optical gain in the ~1.0-1.1 μm spectral domain. The grating is designed to yield single, first-order operation ($m=-1$, only) and exhibits high dispersion (1740 lines/mm). The grating is operated at near-Littrow incidence. In a possible embodiment, a laser system of this type could for example serve as the transmitter in an aircraft-deployed LiDAR sensor, which performs terrain mapping from an altitude of 10 km, such that a far-field angular deflection of 0.5 mrad would correspond to a 5 m linear displacement for the projected laser spot at the ground. In another embodiment, the laser system could be deployed in a low-earth-orbit satellite, in which case the same 0.5 mrad deflection would correspond to ~200 m linear displacement of the beam spot on the earth surface.

As inferred from Eq. (15), higher-dispersion (i.e. larger-$\mathcal{N}$) gratings provide greater angular deflection $\Delta\theta$ for a given $\Delta\nu$. Operating lower-dispersion gratings in a higher diffraction orders is an alternative approach to increasing $\Delta\theta$. For example, certain blazed low-dispersion gratings including "echelle" gratings can be designed to operate at a single, high diffraction order ($|m|\gg 1$). Typically, first-order gratings offer the highest diffraction efficiency. For example, multi-layer-dielectric gratings of this type can yield diffraction efficiency>95% at $m=-1$.

Figure 7:
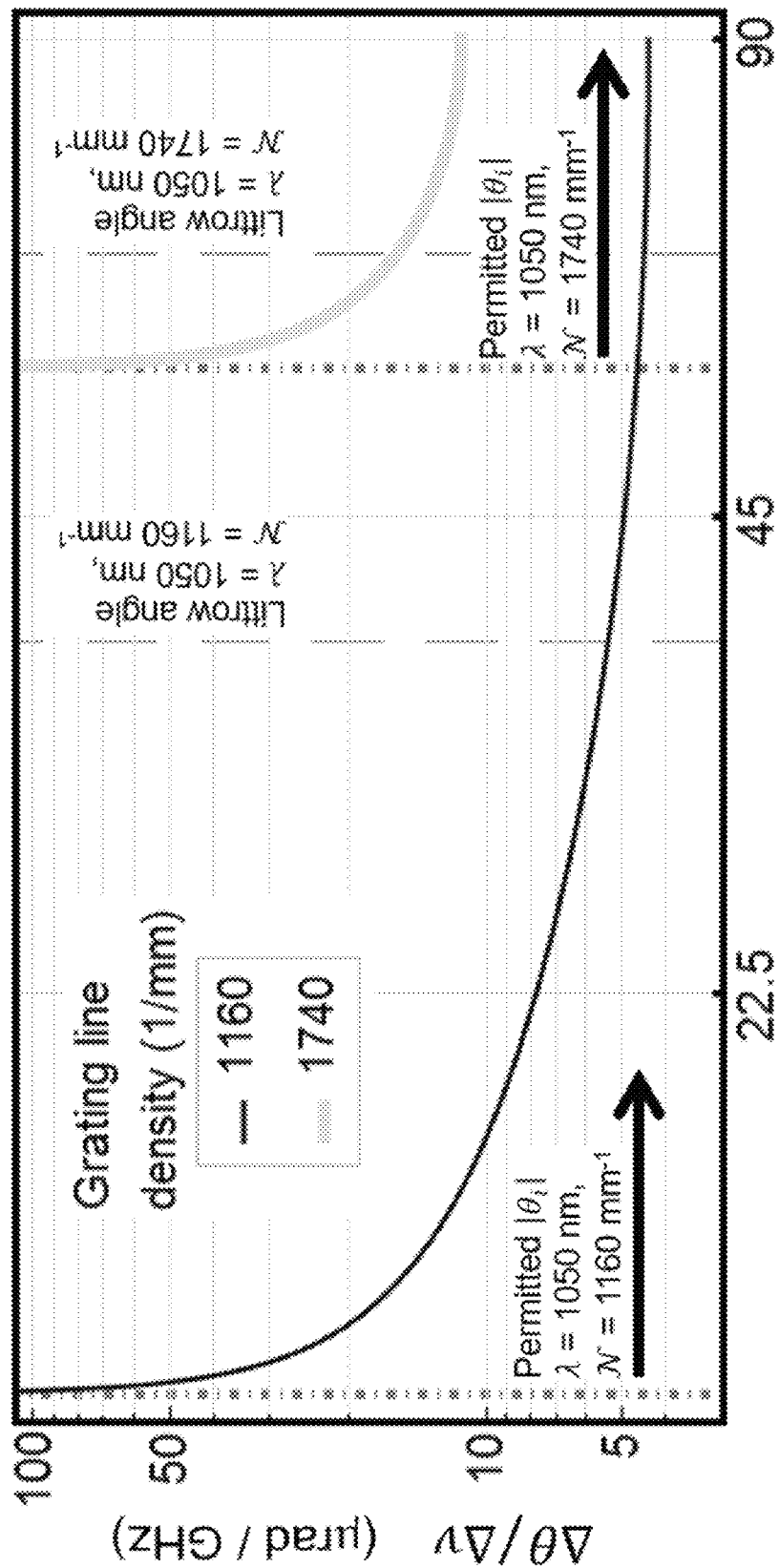
FIG. 7 is a graphical representation of diffraction angle/frequency shift ratio versus incidence angle.

Also inferred from Eq. (15) is the notion that the angular deflection imparted by a grating of given dispersion upon diffraction at a given wavelength increases as the angle of incidence onto the grating becomes smaller, i.e. when the input laser beam impinges upon the grating closer to normal incidence. This intrinsic grating property can be leveraged to further enhance the magnitude of beam steering for a given frequency shift (i.e. the beam-steering efficiency $\Delta\theta/\Delta\nu$) and is illustrated in FIG. 7, in some cases of practical interest. In FIG. 7, the Littrow angle is such that incident and diffracted beam overlap in space such that $\theta_i=\theta$ and thus $\sin\theta = m \mathcal{N} \lambda/2$. FIG. 7 shows diffraction-angle/frequency-shift ratio plotted vs. the absolute value of the incidence angle onto the grating, as obtained from Eq. (15). The gratings are assumed to operate in first-order only, with $m=-1$. The black and thick-gray traces correspond to values of grating line density $\mathcal{N} =1160$ and 1740 mm$^{-1}$, respectively. The laser beam wavelength is taken to be 1050 nm. The long-dashed vertical lines correspond to the Littrow angles for each type of grating (see text). The thick dash-dotted vertical lines mark the position of the smallest incidence angles for which first-order diffraction is allowed, for each grating type.

In other embodiments, the implemented grating can be designed to operate in multiple orders, in a way that the diffraction efficiency is the same in each operating order. Gratings of this type including so-called "Damman" gratings effectively split an incoming beam into a number of beams of equal power, which "fan out" upon diffraction, as qualitatively shown in FIG. 8. In other cases, the grating can act has a "holographic sampler", in which beams diffracted at higher orders exhibit a tailored lower power. In general, while the diffraction-efficiency in each order can be adjusted by judicious design of the grating line profiles, in many cases of interest the diffraction still approximately obeys Eq. (14) for any value of diffraction order m such each of the beams will shift its far pointing angle accordingly. For a given incident-laser frequency shift, however, higher diffraction orders experience proportionally greater dispersion, hence angular deflection, which effectively increase the angular spread of the multi-order diffracted beam fan. In other embodiments, the diffractive grating can be replaced by a virtually imaged phase-array (VIPA) etalon, namely a special type of Fabry-Perot etalon known in the art as capable to yield significantly higher angular dispersion than ordinary gratings for a given optical frequency shift.

Figure 8:
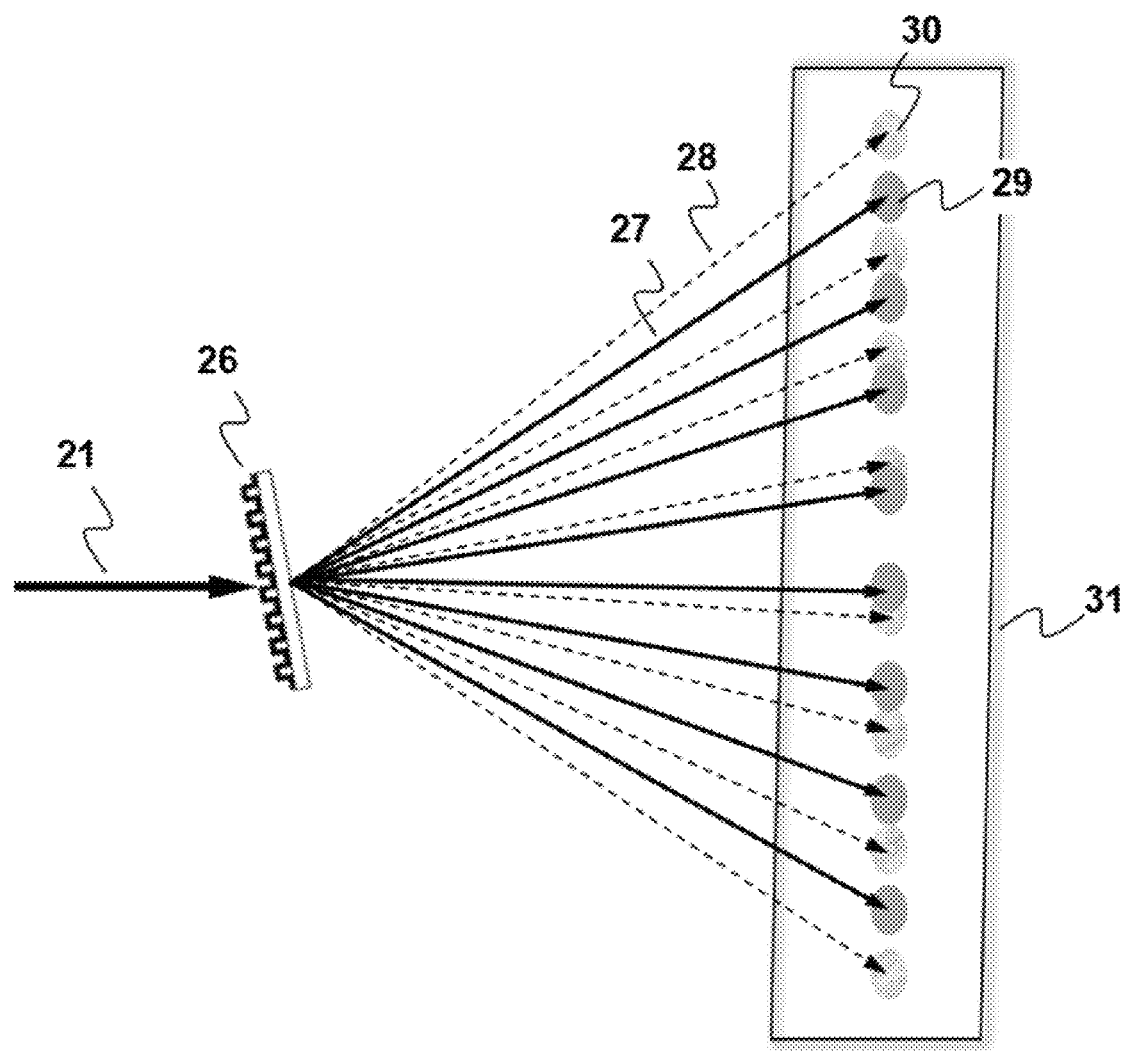
FIG. 8 is a schematic representation of an example transmissive grating that can form a part of a beam steering system.

FIG. 8 shows a transmissive grating 26 designed for operation at multiple diffraction orders 27. In this example, the incident-beam 21 frequency is shifted, such that each diffractive-order beam will spread angularly 28, hence the beam footprints 29 (dark gray) on a far-field surface 31 will spread linearly 30 in the grating dispersive plane.

Figure 9:
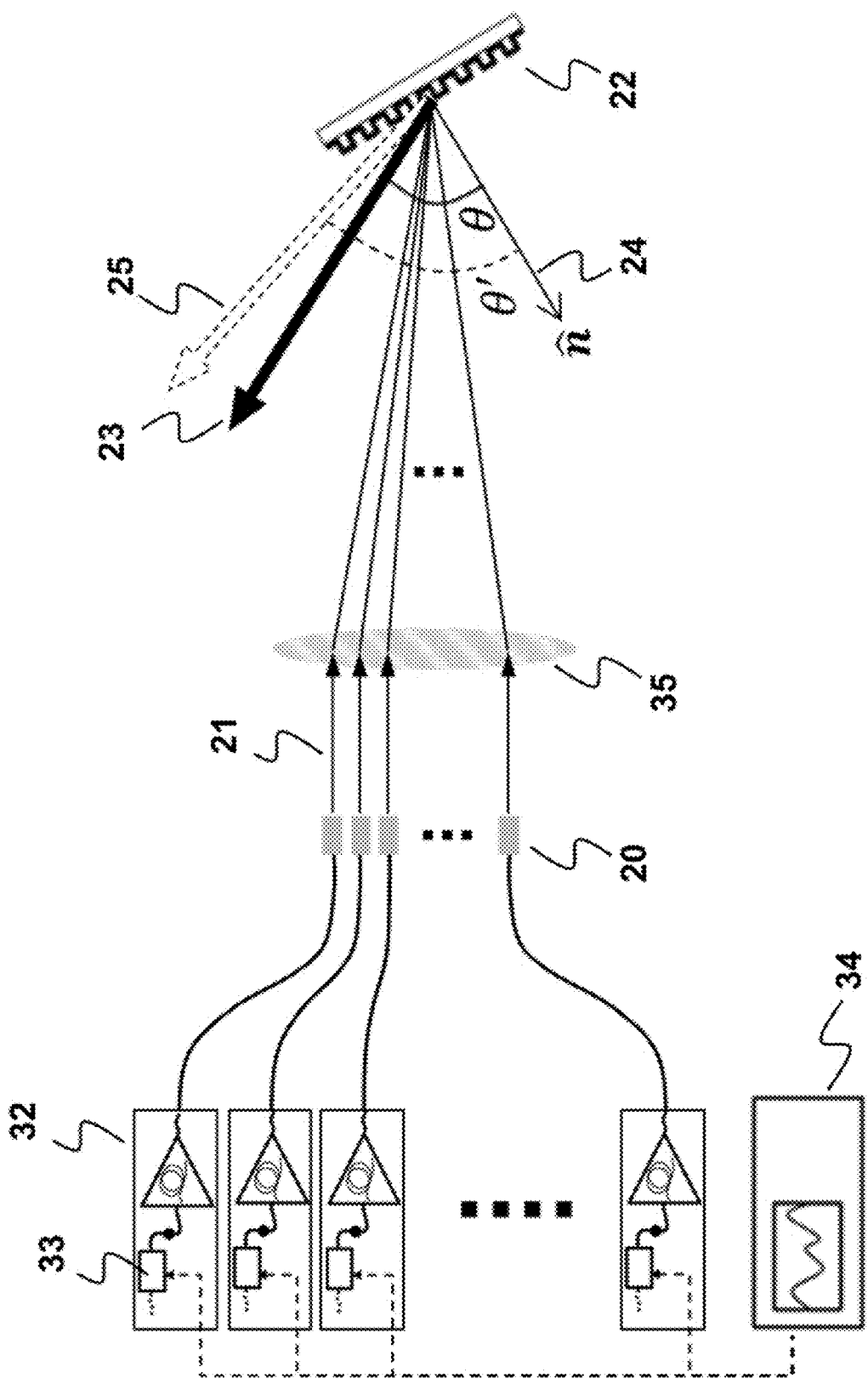
FIG. 9 is an example embodiment of a dispersive beam steering system having frequency shifting in spectrally-beam-combined laser array.

FIG. 9 shows an example implementation of dispersive beam steering via frequency shifting in a spectrally-beam-combined laser array, shown through the example of spectral beam combination of N fiber-based laser sources, often adopted in high-energy lasers architectures for directed energy applications. Each laser source includes a fiber amplifier chain 32 and a phase modulator 33. The phase modulators are driven by a common voltage-control source 34. Each laser operates at a distinct wavelength, such that the beams are focused at the grating 22 by a transform optical component 35, and thus emerge as spatially overlapped 23 upon diffraction. By applying a common frequency shift to all lasers via their phase modulators, the combined beam steer while remaining a spatially single beam. By applying different frequency shifts to different lasers, instead, the spatial properties of the emerging beam can be continuously adjusted to achieve a continuous variety of far-field angular profiles, including the case of having N spatially separate beams.

In many cases of practical interest, including the use of such arrays for the purpose of obtaining high-power sources for directed energy applications, the arrayed lasers feature similar architecture as that in FIG. 5 and may therefore include low-power single-frequency master oscillators such as fiber-coupled diode lasers, which are power-amplified in a chain of rare-earth-doped fiber amplifiers, such as Yb-doped fiber amplifiers for operation within the 1.0-1.1 wavelength region.

Within each of the arrayed lasers, a fiber-coupled EO OPM is installed, located between the master oscillator and fiber amplifier chain. In some embodiments, the EO OPMs are driven by a centralized, multi-channel high-speed voltage source, which can include broadband digital waveform synthesizers. In some embodiments, the EO OPMs can also be used for generating distinct optical-phase patterns to broaden the spectral linewidth of the master-oscillator and thus preventing stimulated Brillouin scattering parasitics from occurring in the fiber-amplifiers, as taught in the art. The beams are collimated upon exiting each laser, for example by means of fiber endcaps equipped with lensed facets or by externally installed lenses, so as to form a planar array of parallel beams with specific inter-beam spacing (spatial pitch) and directed to an external common "transform" optical component (lens, as shown in FIG. 9, or curved mirror), which directs each beam to impinge upon a diffraction grating at the correct angle such that all beams emerge combined, i.e., spatially overlapped in the near and far field, upon diffraction. In many embodiments of practical interest, such grating is a reflective multi-layer-dielectric coated, high-dispersion binary grating etched on a ultra-low-optical absorption fused-silica or silicon substrate capable of withstanding high power and optical intensity while introducing minimal thermo-optical beam quality degradation. In many practical embodiments of spectrally combined lasers, the wavelength difference between adjacent beams is uniform across the array. In such a case the relationship between the wavelength difference, $\delta\lambda$, between adjacent beams; spatial pitch, d, of the beam array; focal length, $f$, of the transform optical component; and grating dispersion, $\mathcal{N}$, takes on a particularly simple and well known form:

$$d \sim \frac{\mathcal{N} f \delta\lambda}{\cos\theta}, \quad (16)$$

where $\theta$ is the exit angle of the combined beam (see FIG. 9) and also the incidence angle of the central beam in the array (Littrow configuration). All beams are taken to be mutually close enough in wavelength that each impinges on the grating at an angle close to $\theta$ as well.

In this embodiment, an angular deflection $\theta'-\theta=\Delta\theta$ can be imparted upon the emerging combined-beam by applying a frequency shift $\Delta v_j$ to the j-th beam in the array such that $$\Delta v_j \sim -\frac{v_{j0}^2}{c} \frac{\cos\theta}{\mathcal{N}} \Delta\theta, \quad (17)$$

where $v_{j0}$ is the carrier optical frequency of the j-th beam. The frequency shifts can be imparted using the phase modulation patterns discussed above. In some embodiments related for example to field-deployed directed-energy weapon systems based on spectral beam combining, the high speed of the angle-shifting mechanism described in this disclosure can be leveraged to compensate in real time for thermo-mechanical jitter, which may especially degrade the beam overlap, hence the beam quality, in the dispersion plane. To this end, the OPM drive electronics can be integrated in an active control feedback loop which maximizes the energy delivered at the target. If frequency shifts different from those specified by Eq. (17) are applied, the component beams do not steer together and, therefore, their spatial overlap within the combined beam will degrade, leading to a greater (non-diffraction-limited) far-field divergence angle and, ultimately, beam separation. Examples of such behavior are provided in FIG. 10.

Figure 10:
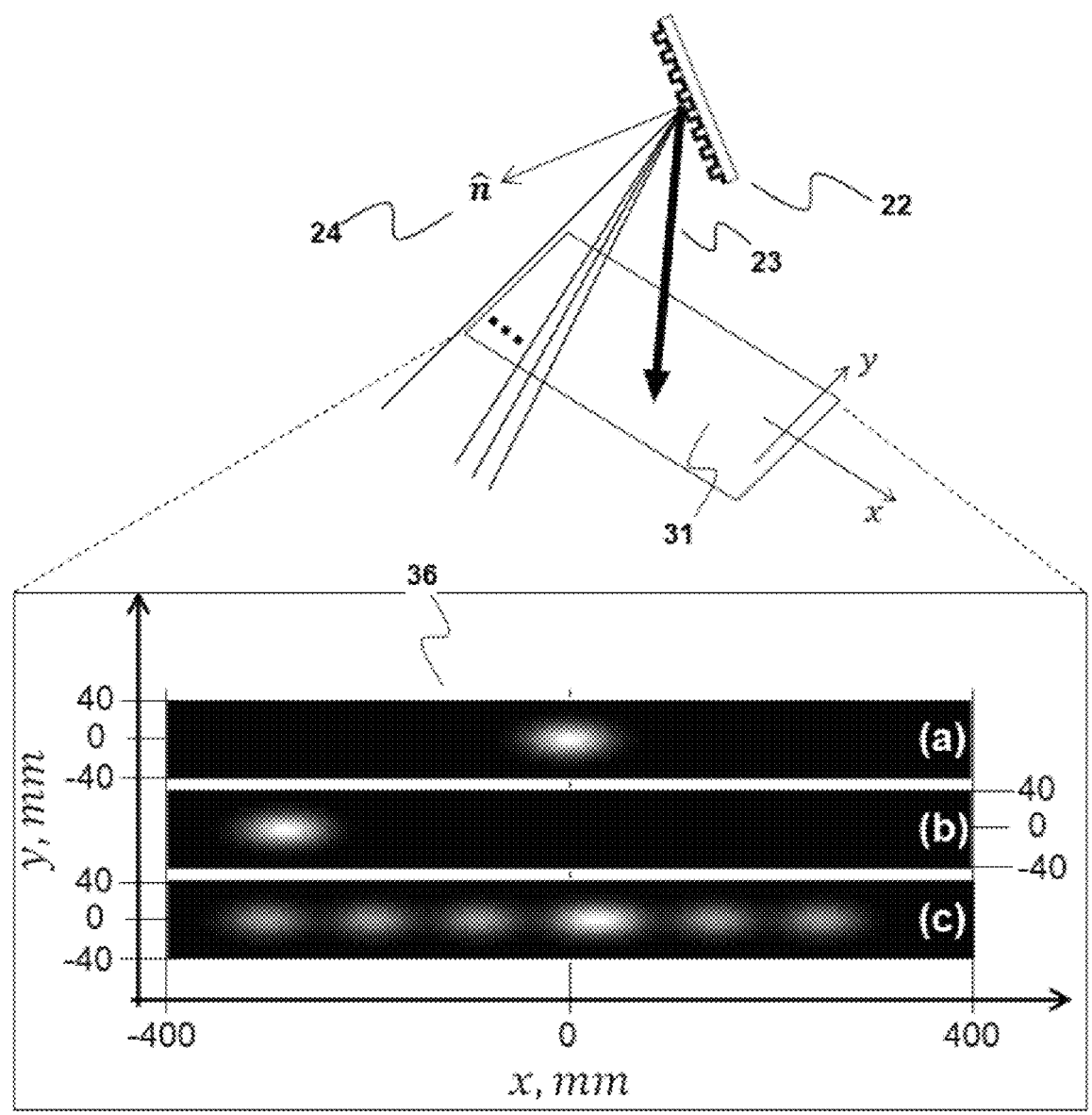
FIG. 10 shows example optical intensity beam profiles for different frequency shift patterns.

FIG. 10 shows optical-intensity beam profiles obtained by applying different frequency-shift patterns to an exemplary array of seven, spectrally combined beams. The profiles are observed on a far-field surface 31 orthogonal to the normal direction to the grating and placed 300 m from the grating. The coordinate x and y denote the grating dispersive and non-dispersive direction, respectively. The profiles correspond to the cases: (a) beams combined, no frequency shifting applied; (b) example of frequency-shift-induced steering of combined beam as a whole; and (c) example of frequency-shift pattern resulting in beam separation. See text for details.

Here, the optical intensity profile I(x,y,z) of light emerging off a reflective grating and projected onto a far-field surface at distance z from the grating is reconstructed in the specific case of an array of seven, spectrally combined laser beams modeled as diffraction-limited Gaussian:

$$I(x, y, z) = \sum_{j=0}^{6} I_{0j} \exp\left\{-\frac{2[(x-z\Delta\theta)\cos(\theta+\Delta\theta)]^2}{\omega^2} - \frac{2y^2}{\omega^2}\right\}. \quad (18)$$

Here, $I_{0j}$ is the peak optical intensity of the j-th beam, $\Delta\theta$ and $\theta$ are defined as in Eq. (17), and $\omega$ is the beam radius at $1/e^2$ intensity points, which is given by $$\omega(z, \lambda) = \omega_0 \sqrt{1 + \left(\frac{\lambda z}{\pi \omega_0^2}\right)^2}, \quad (19)$$

where $\omega_0$ is the beam radius at the grating and $\lambda$ is the beam wavelength. Table 1 summarizes the numerical values used for the simulation in FIG. 10.

TABLE 1

| Numerical values used to calculate the far-field beam intensity profiles shown in FIG. 10. | |
|---|---|
| Simulation parameter | Value |
| Grating line density | $\mathcal{N} = 1740$ mm$^{-1}$ |
| Exit angle for combined beam (*) | $\theta = 66$ deg |
| Distance between far-field surface and grating | z = 100 m |
| Wavelengths of combined beams | $\lambda = (1044 + 2j)$ nm, With j = 0 . . . 6 |
| Beam radius at grating | $\omega_0 = 5$ mm |

The beam intensity profile pattern in FIG. 10(a), which corresponds to a single, diffraction-limited spot, is obtained when Eq. (6) applies and the beams emerge perfectly combined upon diffraction. In this pristine, unperturbed case, all frequency shifts are defined as zero and the origin (x=0) of the axis in the grating dispersive direction is taken to correspond to the combined-beam centroid. The pattern in FIG. 10(b) is obtained by applying a 60 GHz frequency shift uniformly across all beams. In this case, the diffracted beam remained well combined and near diffraction-limited, but the beam is deflected as a whole such that the beam centroid at the far-field pattern is now ~350 mm away from its original position along the dispersive x axis. Finally, the intensity pattern in FIG. 10(c) is obtained by imparting to each of the seven beams a distinct frequency-shift, according to the pattern $$\Delta v_j = (-1)^j \cdot (j - 0.25) \cdot 11 \text{ GHz}, \quad (17)$$

where the index j=0, . . . , 6 corresponds to each of the beams, with the j-th beams having wavelength given by $\lambda_j=1044+2j$ nm. In this case, the beams are no longer combined in the far field, but fan out to form six distinct spots (with this particular frequency-shift pattern, two of the seven beams still remain overlapped and centered near x=0, at this distance from the grating). Many other spatial beam patterns can be obtained by imparting different frequency-shift patterns to the beams and such patterns can all be precisely controlled to vary in time at very high speed, limited only by the bandwidth of the OPMs and their drive electronics.

In some embodiments, such spatial-beam-pattern control capability illustrated in FIG. 10 can be deliberately exploited to provide added functionalities for systems using spectrally combined lasers. For example, a low-power, more widely diverging version of the combined beam could be used as a seeker probe to illuminate and search a target scene. In other embodiments, the spectral beam combination could be used in a LiDAR transmitter, in which case a plurality of time-varying, controlled far-field beam patterns, including single and multi-beam could be used for a diverse range of remote sensing tasks. In one example embodiment, the transmitter could search a battle theatre for potential targets using a wide spreading multi-beam fan, then start tracking a specific target, once identified, by combining all the beam power on it to maximize the return signal and be in this way able to resolve specific target observables such as speed or shape. The speed at which the patterns can be varied is such that, in principle, a different pattern can be produced for each pulse emitted by the pulsed LiDAR transmitter, even at pulse repetition frequencies as high as multi-MHz or higher.

Figure 11:
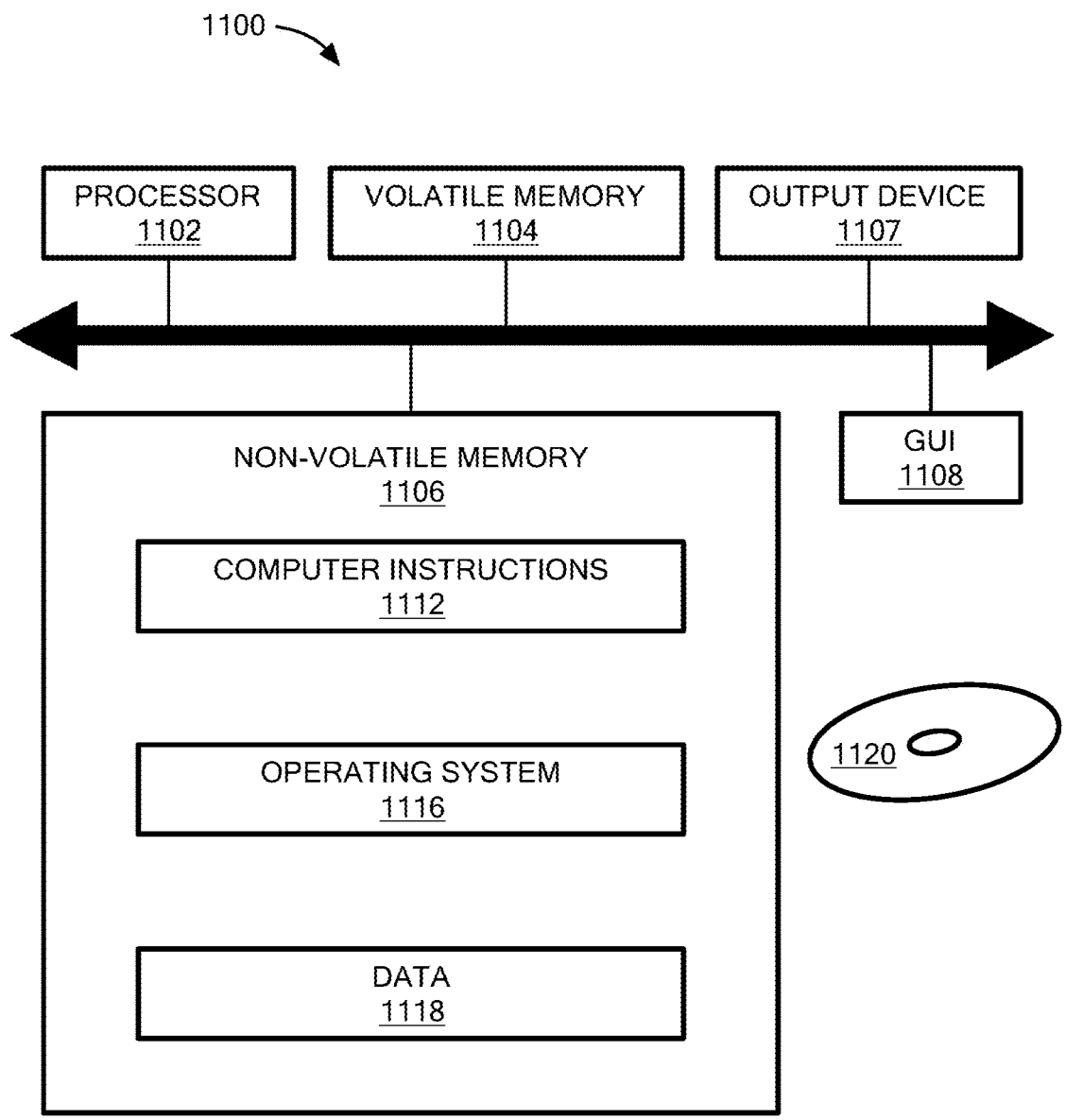
FIG. 11 is a schematic representation of an example computer that can perform at least a portion of the processing described herein.

FIG. 11 shows an exemplary computer 1100 that can perform at least part of the processing described herein. For example, the computer 1100 can perform processing to generate signals to configure circuit elements in the first, second, and/or third layers. The computer 1100 includes a processor 1102, a volatile memory 1104, a non-volatile memory 1106 (e.g., hard disk), an output device 1107 and a graphical user interface (GUI) 1108 (e.g., a mouse, a keyboard, a display, for example). The non-volatile memory 1106 stores computer instructions 1112, an operating system 1116 and data 1118. In one example, the computer instructions 1112 are executed by the processor 1102 out of volatile memory 1104. In one embodiment, an article 1120 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to the disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub-combination. Other embodiments not specifically described herein are also within the scope of the following claims.

What is claimed is:

1. An optical beam steering system, comprising:
a laser to generate a beam having an optical frequency;
an optical phase modulator (OPM) to impart a shift in the optical frequency of the beam from the laser; and
a dispersive optical element to map the shift in the optical frequency to a corresponding angle with respect to the dispersive optical element, wherein the dispersive optical element comprises a diffraction grating to generate a diffracted beam with a diffraction angle corresponding to the optical frequency of the beam from the OPM, wherein the diffracted beam forms the diffraction angle with respect to a normal to a surface of the diffraction grating.

2. The system according to claim 1, wherein the laser comprises a monochromatic laser.

3. The system according to claim 1, wherein the optical phase modulator comprises a fiber-coupled device having an electro-optically active crystal.

4. The system according to claim 1, wherein the optical phase modulator comprises an electro-optic modulator (EOM).

5. The system according to claim 1, wherein the optical phase modulator comprises an electro-optic modulator (EOM) having a purely capacitive input.

6. The system according to claim 1, further including a signal generator to drive the OPM with a saw tooth voltage waveform.

7. The system according to claim 1, further including an optical band-pass filter to filter an output of the OPM.

8. The system according to claim 7, wherein the optical band-pass filter includes a pass band centered on an optical frequency of a side band.

9. The system according to claim 1, wherein the shift in the optical frequency of the beam from the laser is performed completely in an opto-electronic domain without moving parts.

10. The system according to claim 1, further including a fiber amplifier coupled to an output of the OPM.

11. The system according to claim 1, wherein the diffraction grating is transmissive or reflective.

12. The system according to claim 1, wherein the diffraction grating comprises a binary grating.

13. The system according to claim 1, wherein the diffraction grating is configured to operate in multiple orders with a diffraction efficiency the same in each of the multiple orders.

14. The system according to claim 1, further including additional lasers to produce additional beams, wherein the laser and the additional lasers each have a distinct frequency and the OPM imparts an optical frequency shift to the additional beams, each of the additional beam shifted in frequency such that the dispersive optical element generates a spatially single beam.

15. The system according to claim 1, further including a transform optical component to focus the beam at the dispersive optical element.

16. The system according to claim 1, wherein the optical beam steering system forms a part of a LiDAR system.

17. A system, comprising:
- a plurality of lasers each configured to emit a respective beam;
- at least one dispersive optical element to spatially combine the beams from the plurality of lasers; and
- at least one optical phase modulator to impart an optical frequency shift pattern to the beams from the plurality of lasers such that the at least one dispersive optical element maps the optical frequency shift pattern into a far-field spatial beam pattern;

wherein the at least one dispersive optical element comprises a diffraction grating to generate a diffracted beam with a diffraction angle corresponding to the optical frequency shift pattern of the beams from the at least one optical phase modulator, wherein the diffracted beam forms the diffraction angle with respect to a normal to a surface of the diffraction grating.

18. A system, comprising:
- a laser;
- an optical phase modulator to shift in optical frequency a beam from the laser; and
- one or more dispersive optical elements for splitting the beam into multiple diffraction orders of equal or different optical intensities such that frequency shifts in the laser result in modifications of a dispersed-beam far-field spatial pattern of intensity, wherein the one or more dispersive optical elements comprise one or more diffraction gratings to generate one or more diffracted beams each with a diffraction angle corresponding to the optical frequency of the beam from the optical phase modulator, wherein each of the one or more diffracted beams forms the diffraction angle with respect to a normal to a surface of one of the one or more diffraction gratings.

* * * * *